US009640856B2

(12) United States Patent
Malek

(10) Patent No.: US 9,640,856 B2
(45) Date of Patent: May 2, 2017

(54) DUAL ANTENNA FEED CLIP

(71) Applicant: Apple Inc., Cupertino, CA (US)

(72) Inventor: Shayan Malek, San Jose, CA (US)

(73) Assignee: Apple Inc., Cupertino, CA (US)

(*) Notice: Subject to any disclaimer, the term of this patent is extended or adjusted under 35 U.S.C. 154(b) by 422 days.

(21) Appl. No.: 13/861,212

(22) Filed: Apr. 11, 2013

(65) Prior Publication Data

US 2014/0270917 A1 Sep. 18, 2014

Related U.S. Application Data

(60) Provisional application No. 61/794,755, filed on Mar. 15, 2013.

(51) Int. Cl.
*H01Q 1/24* (2006.01)
*H01R 12/71* (2011.01)

(52) U.S. Cl.
CPC ............. *H01Q 1/24* (2013.01); *H01R 12/714* (2013.01); *Y10T 29/49018* (2015.01); *Y10T 403/3906* (2015.01)

(58) Field of Classification Search
CPC .......... H01Q 1/24; H01Q 1/50; H01R 12/714; Y10T 403/3906
See application file for complete search history.

(56) References Cited

U.S. PATENT DOCUMENTS

| 3,512,162 A * | 5/1970 | Charles ................. H01Q 1/084 343/702 |
| 6,963,311 B1 | 11/2005 | Enns |
| 7,161,538 B2 | 1/2007 | Zhang et al. |
| 7,750,857 B2 * | 7/2010 | Kim .............................. 343/702 |
| 8,330,655 B2 | 12/2012 | Zadesky |
| 2013/0002494 A1 | 1/2013 | Ayala et al. |
| 2013/0002517 A1 | 1/2013 | Pascollini et al. |

* cited by examiner

*Primary Examiner* — Matthieu Setliff
(74) *Attorney, Agent, or Firm* — Michael H. Lyons

(57) ABSTRACT

A multiple antenna feed assembly including an antenna feed support having a body made of an electrically insulating material and a method of forming the antenna feed assembly. The antenna feed support may have a slot adapted to receive a connector; and a gap formed in the body having a thickness to fit a printed circuit board (PCB). The multiple antenna feed assembly may include a first connector adapted to fit in the slot of the antenna feed support; and a second connector electrically isolated from the first connector. Also provided is an antenna feed support to provide structural support and electrical isolation for the components of a multiple antenna feed assembly as above.

20 Claims, 9 Drawing Sheets

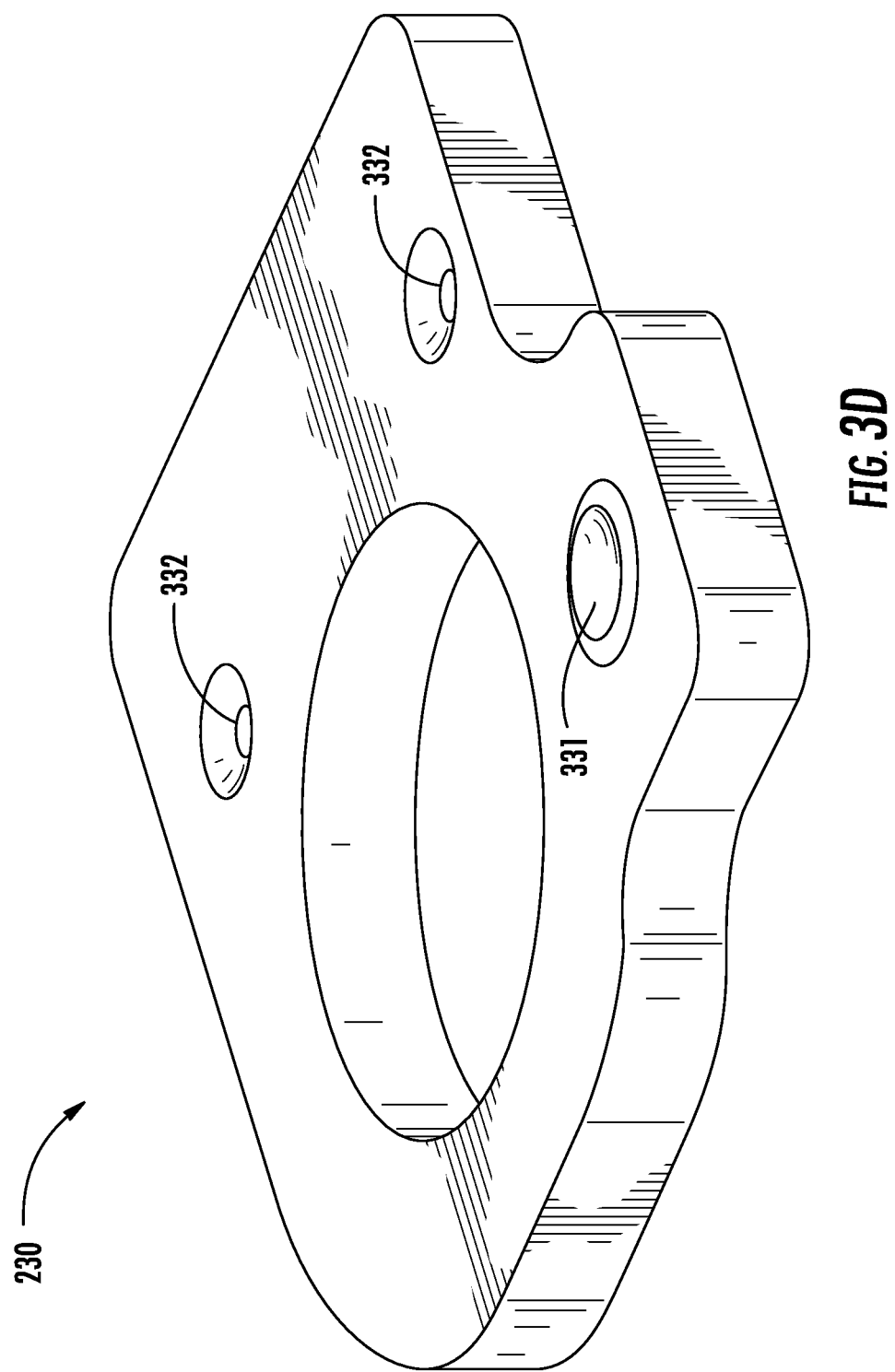

DUAL ANTENNA FEED CLIP

CROSS-REFERENCE TO RELATED APPLICATIONS

This application claims the benefit under 35 U.S.C. 119(e) of U.S. Provisional Patent Application No. 61/794,755, filed Mar. 15, 2013 and entitled "DUAL ANTENNA FEED CLIP" by Shayan MALEK, which is incorporated herein by reference in its entirety for all purposes.

FIELD OF THE DESCRIBED EMBODIMENTS

The described embodiments relate generally to methods, devices, and systems for mounting multiple antennas in a handheld electronic device. More particularly, embodiments in the present disclosure relate to a device including a single molded antenna feed support, and methods for mounting the device to a handheld electronic device.

BACKGROUND

In the field of handheld electronic devices antennas play a significant role as input and output sources of information. In a typical device, more than one antenna can be found, each dedicated to a specific application, such as blue-tooth communication with external appliances, access to a cellular network, access to a global positioning system (GPS) network, or access to a WiFi network. While different antennas operate in different spectral slots within a radio-frequency (RF) range (from tens and hundreds of MegaHertz up to several GigaHertz), interference of signals between different antennas is a problem. Further, coupling of the multiple antennas to the RF circuitry inside the electronic device while avoiding interference between the antennas is a challenging task. The task is especially difficult in configurations where spatial constraints are relevant, such as handheld devices.

Current approaches to solving this problem include the use of complex connectors reaching each of the different antennas from the PCB layout. In order to avoid interference and faulty electrical contacts, the connectors used have complicated shapes and odd form factors. As a result, the shape of connectors has little tolerance to manufacturing errors or rugged usage, leading to numerous reliability failures. Some approaches include the use of multiple connectors and structural components in the antenna feed assembly, involving the use of adhesives, shims and spacers, and adding to the manufacturing complexity of the handheld electronic device.

Therefore, what is needed is a method and a system for securely and reliably mounting a plurality of antennas inside a handheld electronic device. What is also needed is a method and a device for securely and reliably mount a plurality of connectors for a plurality of antennas inside a handheld electronic device.

SUMMARY OF THE DESCRIBED EMBODIMENTS

In a first embodiment, an antenna feed support for a multiple antenna feed assembly may include a body made of an electrically insulating material; a slot adapted to receive a first connector; and a gap formed in the body having a thickness to fit a printed circuit board (PCB). Further according to the first embodiment, the body may be adapted to provide electrical insulation between the first connector and a second connector. Also, the body may be adapted to provide structural support to the first connector and to the second connector.

In a second embodiment, a multiple antenna feed assembly may include an antenna feed support having a body made of an electrically insulating material. The antenna feed support may have a slot adapted to receive a connector; and a gap formed in the body having a thickness to fit a printed circuit board (PCB). The multiple antenna feed assembly may include a first connector adapted to fit in the slot of the antenna feed support; and a second connector electrically isolated from the first connector.

In a third embodiment, a method of forming a multiple antenna feed assembly may include providing an antenna feed support having an insulating spacer; assembling a first connector to the antenna feed support, and installing the antenna feed support onto a printed circuit board (PCB) to form a PCB-antenna feed assembly. The method may include attaching the PCB-antenna feed assembly on a housing of a handheld electronic device with a fastener, and attaching a second connector to the PCB-antenna feed assembly.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments can be better understood by reference to the following description and the accompanying drawings. Additionally, advantages of the described embodiments can be better understood by reference to the following description and accompanying drawings. These drawings do not limit any changes in form and detail that can be made to the described embodiments. Any such changes do not depart from the spirit and scope of the described embodiments.

FIG. 3D illustrates a perspective view of a connector for a multiple antenna feed assembly, according to some embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments can be used, and changes can be made without departing from the spirit and scope of the described embodiments.

In a handheld electronic device and other portable consumer electronic devices available today, a plurality of RF antennas can be used. In such applications it is desirable to have a reduced number of printed circuit boards (PCBs) handling the information that is transmitted though the antennas. In some embodiments, a single PCB can process the signals transmitted by two or more antennas. Electronic devices having multiple RF antennas as disclosed herein can include cellular phones, tablets, laptops, and other handheld electronic devices and portable electronic devices. When different antennas are spatially separated and have different form factors, connectors coupling the antennas to the PCB are conveniently mounted on a single antenna feed support, according to embodiments disclosed herein. Furthermore, in some embodiments the antenna feed support is made of a plastic material, or another electrical insulating material, so as to reduce interference between the signals of the two or more different antennas. In some embodiments where a multiple antenna feed support is made of plastic, the clip can be injection molded into shape, simplifying large scale manufacture and enhancing reliability. Indeed, by mounting the antenna connectors and the PCB circuit onto slots in a plastic body the position tolerance is increased due to the flexibility and resilience of a plastic material. Moreover, using an assembly having an antenna feed support as disclosed herein provides a secure and reliable structure to the connectors for the multiple antennas. Thus, embodiments as disclosed herein provide enhanced ruggedness to the performance of a handheld electronic device.

Figure 1:
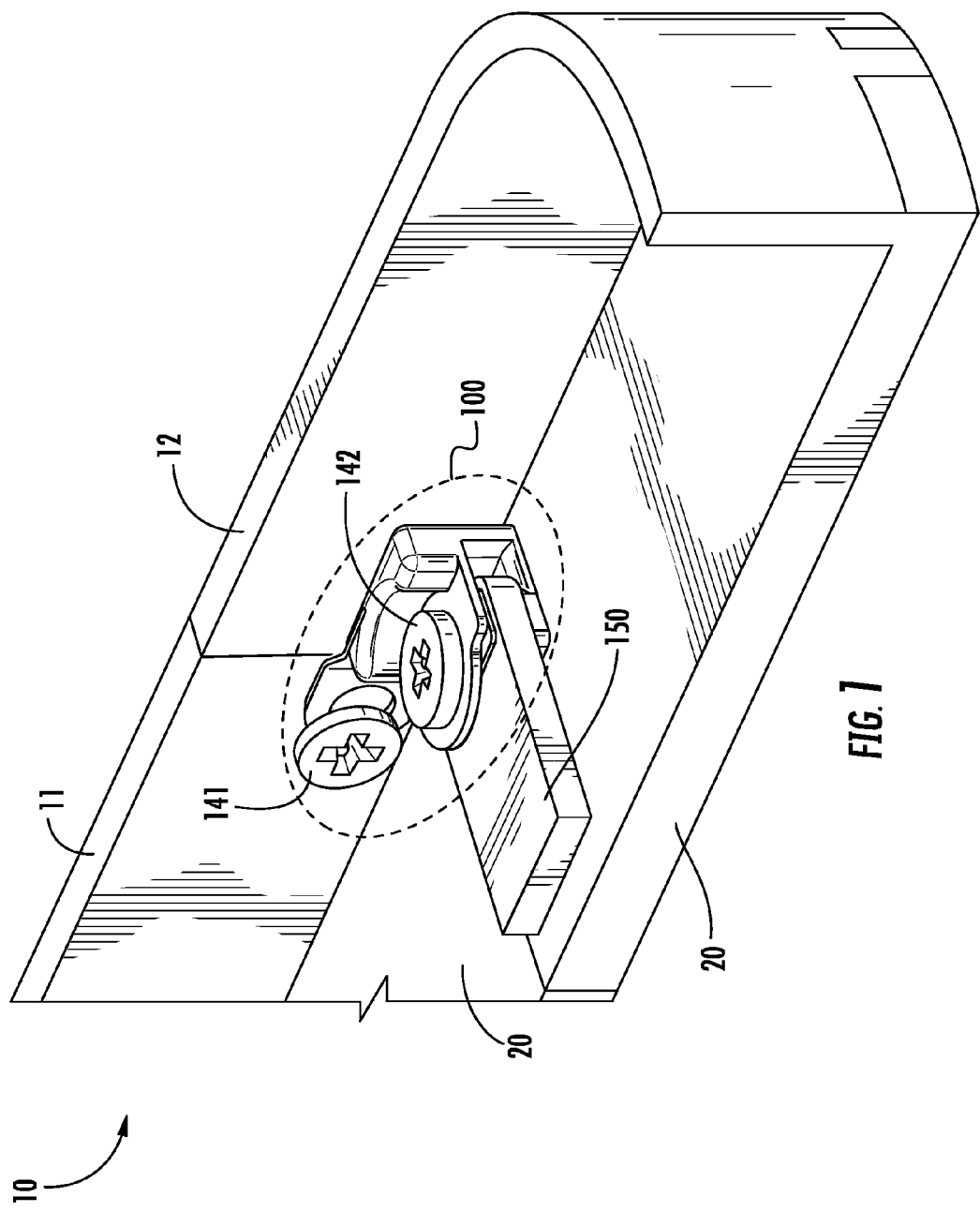
FIG. 1 illustrates a partial perspective view of a handheld electronic device including a multiple antenna feed assembly, according to some embodiments.

FIG. 1 illustrates a partial perspective view of a handheld electronic device 10 including a multiple antenna feed assembly 100, according to some embodiments. Handheld electronic device 10 can include a first antenna 11 and a second antenna 12 integrated into a housing 20. Multiple antenna feed assembly 100 is securely fixed to each of first antenna 11 and second antenna 12 through fasteners 141 and 142, respectively. In some embodiments fasteners 141 and 142 include screws, bolts, or any other mechanical fixture. In addition to providing a secure attachment to antennas 11 and 12 in housing 20, fasteners 141 and 142 can provide electrical coupling between each one of antennas 11 and 12, and a connector in multiple antenna feed assembly 100. FIG. 1 also illustrates a PCB 150 inserted into multiple antenna feed assembly 100. Accordingly, PCB 150 can include RF circuitry to process signals transmitted through antennas 11 and 12. PCB 150 can also include a logic processing unit of handheld electronic device 10.

While FIG. 1 illustrates two antennas 11 and 12, any number of feeds for other antennas in a handheld electronic device can be arranged to fit into assembly 100. One of ordinary skill will recognize that a third, a fourth, or even a fifth connector for an equal number of antennas can be fit into multiple antenna feed assembly 100.

Figure 2:
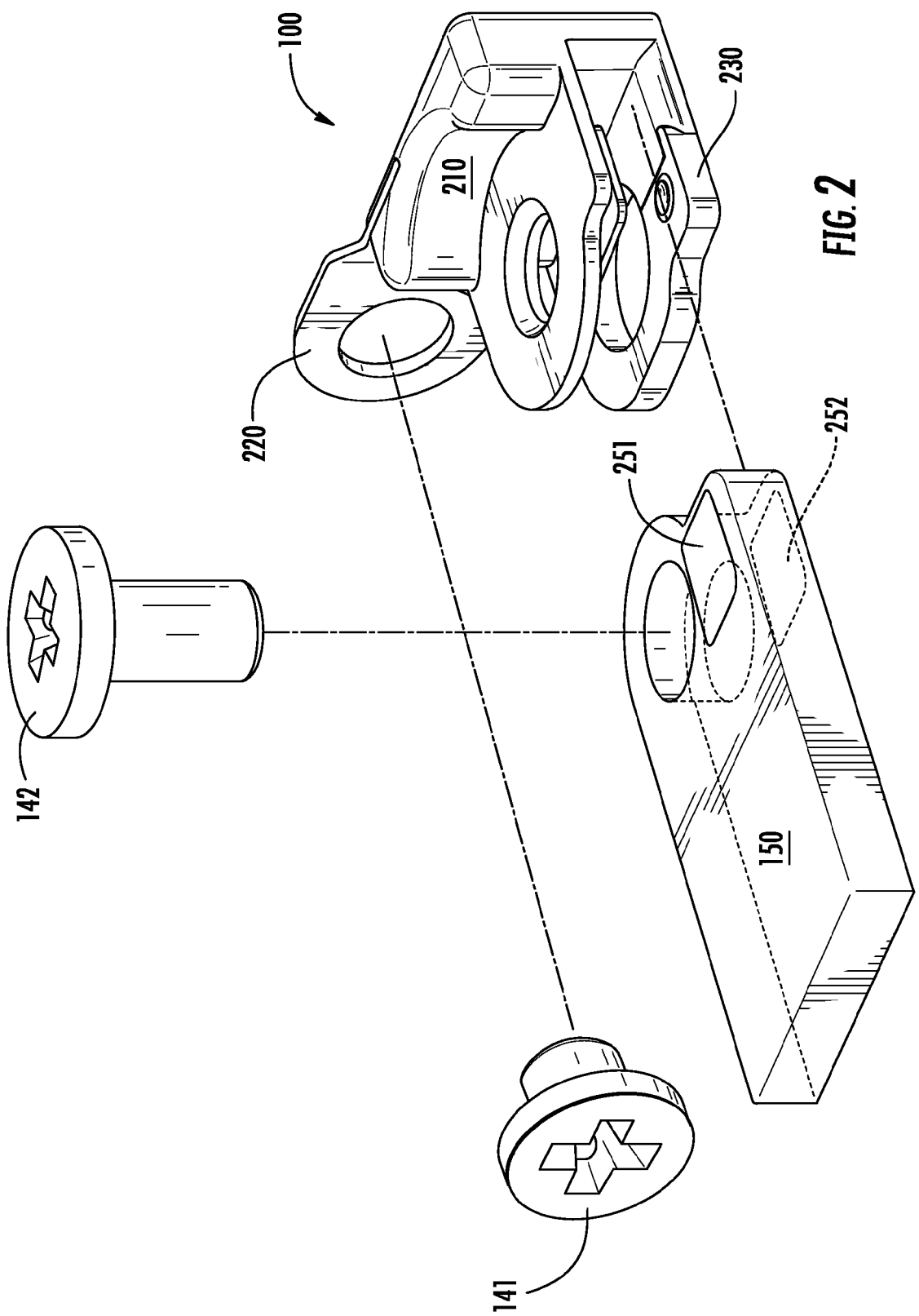
FIG. 2 illustrates a perspective view of a multiple antenna feed assembly, according to some embodiments.

FIG. 2 illustrates a perspective view of a multiple antenna feed assembly 100 including antenna feed support 210, according to some embodiments. Antenna feed support 210 may be formed of a dielectric material such as a plastic, or any other material having a high dielectric constant. FIG. 2 illustrates components and parts that are assembled together into multiple antenna feed assembly 100, such as PCB 150 and fasteners 141 and 142. PCB 150 receives and transmits signals to either one of antennas 11 and 12 through terminals 251 and 252. In some embodiments, terminals 251 and 252 include exposed copper pads to form an electrical coupling with connectors 220 and 230. Furthermore, terminals 251 and 252 can be formed of any other conducting material such as tin, aluminum, gold, an alloy of different metals, or a combination of the above. Accordingly, terminal 251 can couple signals between PCB 150 and antenna 11, and terminal 252 can couple signals between PCB 150 and antenna 12.

Multiple antenna feed assembly 100 includes antenna feed support 210 admitting a connector 220 and a connector 230. Connector 220 couples antenna 11 to PCB 150 through terminal 251. And connector 230 couples antenna 12 to PCB 150 through terminal 252. According to some embodiments, fastener 141 attaches multiple antenna feed assembly 100 to antenna 11, ensuring that an electrical coupling is formed between connector 220 and antenna 11. Likewise, fastener 142 attaches multiple antenna feed assembly 100 to antenna 12, ensuring that an electrical coupling is formed between connector 230 and antenna 12. In addition, fastener 142 ensures that PCB 150 is fixed into multiple antenna feed assembly 100 so that an electrical coupling is formed between connector 220 and PCB 150, through terminal 251. Likewise, fastener 142 ensures that an electrical coupling is formed between connector 230 and PCB 150 through terminal 252.

In some embodiments connectors 220 and 230 and fasteners 141 and 142 in multiple antenna feed assembly 100 can be formed of a metal or an electrically conductive material. For example, connectors 220 and 230 can be formed of steel, copper, aluminum, gold, or any alloy of the above metals. In some embodiments connectors 220 and 230 can be formed of a combination of the above materials. On the other hand, antenna feed support 210 can be formed of an insulating material, such as a plastic. In that regard, antenna feed support 210 can be formed of a single injection molded piece. Accordingly, antenna feed support 210 provides structure to assembly 100, and also maintains electrical isolation between connector 220 and connector 230. Furthermore, according to some embodiments antenna feed support 210 provides electrical isolation to connectors 220 and 230 from portions of housing 20. For example, antenna feed support 210 ensures electrical isolation between connector 220 and portions of housing 20 including second antenna 12.

Figure 3A:
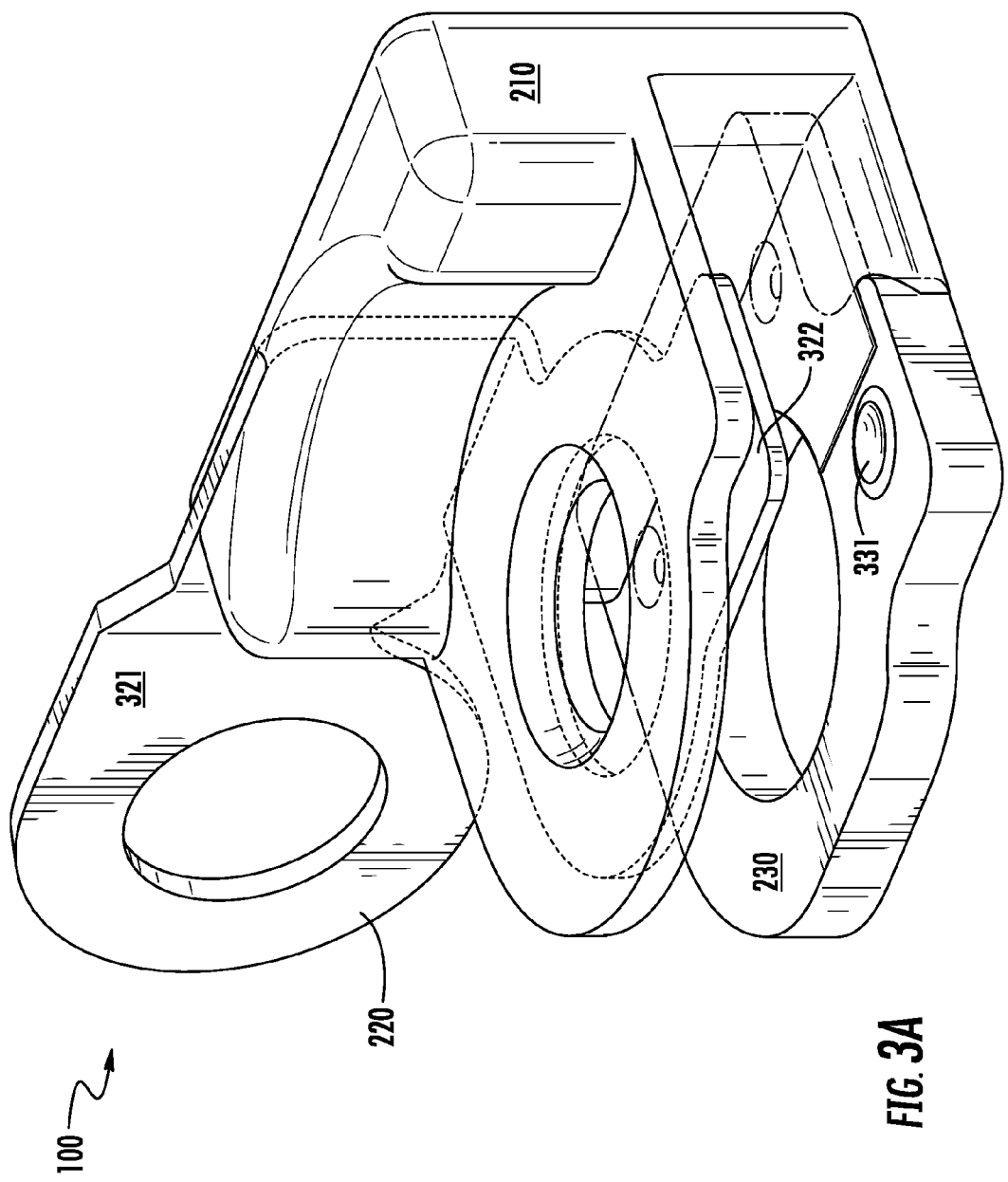
FIG. 3A illustrates a perspective view of a multiple antenna feed assembly, according to some embodiments.

FIG. 3A illustrates a perspective view of multiple antenna feed assembly 100 including antenna feed support 210, according to some embodiments. Antenna feed support 210 includes connectors 220 and 230. Connector 220 includes fixtures 321 and 322. Fixture 321 is shaped to receive fastener 141 (cf. FIG. 2) and provide electrical coupling between antenna 11 and connector 220. In some embodiments, fixture 321 is shaped as a flat ring having a hole allowing fastener 141 to go through. Fixture 321 has a shape with a flat portion to make contact with a surface of antenna 11. Fixture 322 is shaped to receive fastener 142 (cf. FIG. 2) and provide electrical coupling between PCB 150 and connector 220, through terminal 151. In some embodiments fixture 322 has a flat ring shape similar to fixture 321.

Figure 3B:
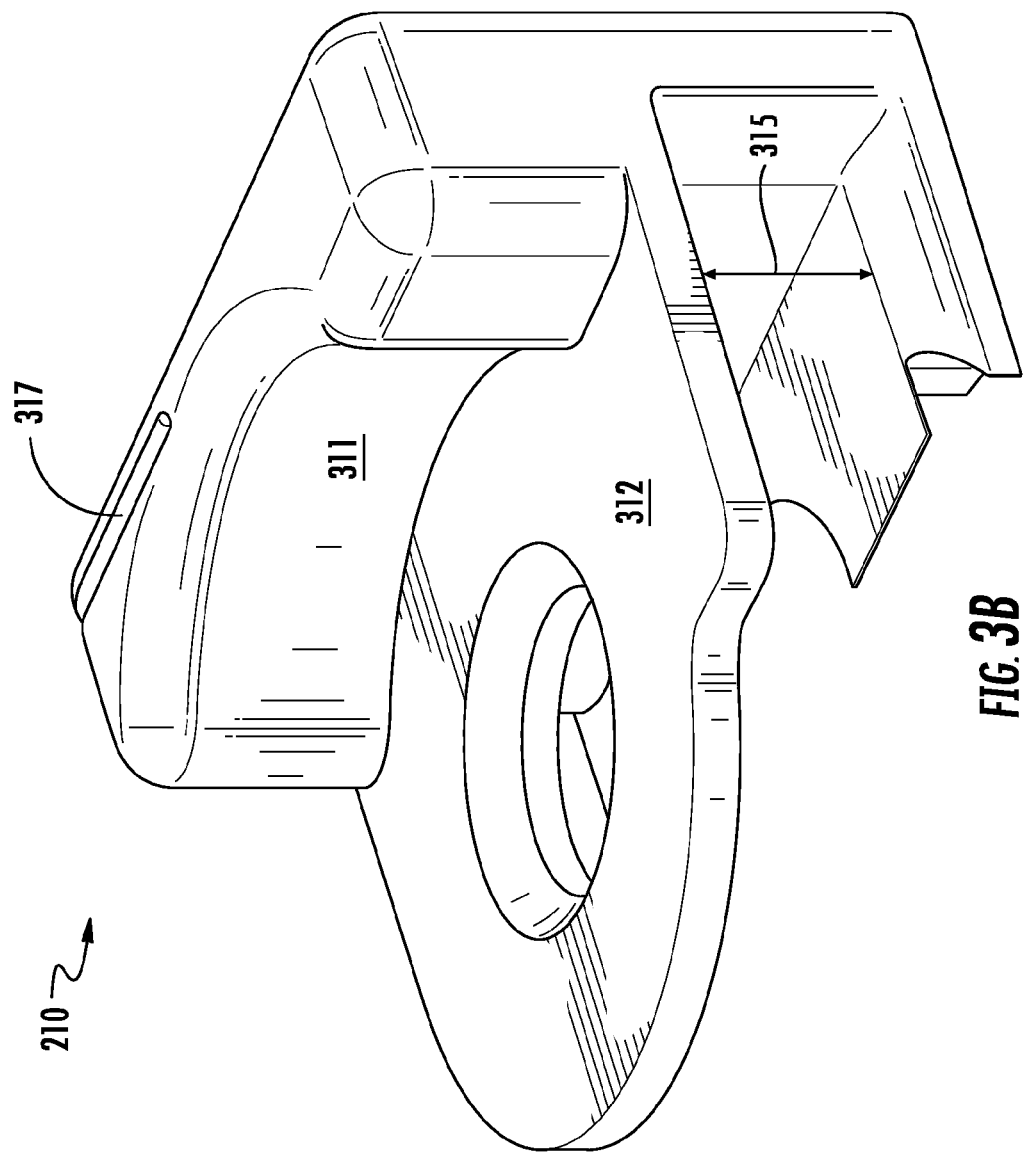
FIG. 3B illustrates a perspective view of an antenna feed support for a multiple antenna feed assembly, according to some embodiments.

FIG. 3B illustrates a perspective view of antenna feed support 210 for multiple antenna feed assembly 100, according to some embodiments. Antenna feed support 210 includes an antenna feed support body 311 having a slot 317 and a gap 315, the gap having a thickness. Gap 315 is formed with a shape to fit the PCB 150, so that body 311 may slide over PCB 150 and securely hold PCB 150 in place. Accordingly, gap 315 in body 311 may have a shape that fits the profile of an end portion of PCB 150, proximal to gap 315. Body 311 provides structural support to connector 220 and connector 230, while providing electrical insulation between connector 220 and connector 230. Antenna feed support 210 can also include a ledge 312 having a shape adapted to receive and support fastener 142 on one side (e.g., the top side of ledge 312). And ledge 312 can also be formed to antenna feed support fixture 322 of connector 220 on the opposite side (e.g., the bottom side of ledge 312). In some embodiments ledge 312 also creates electrical insulation between fastener 142 (which can be made of an electrically conductive material) and fixture 322 (cf. FIG. 3A).

Figure 3C:
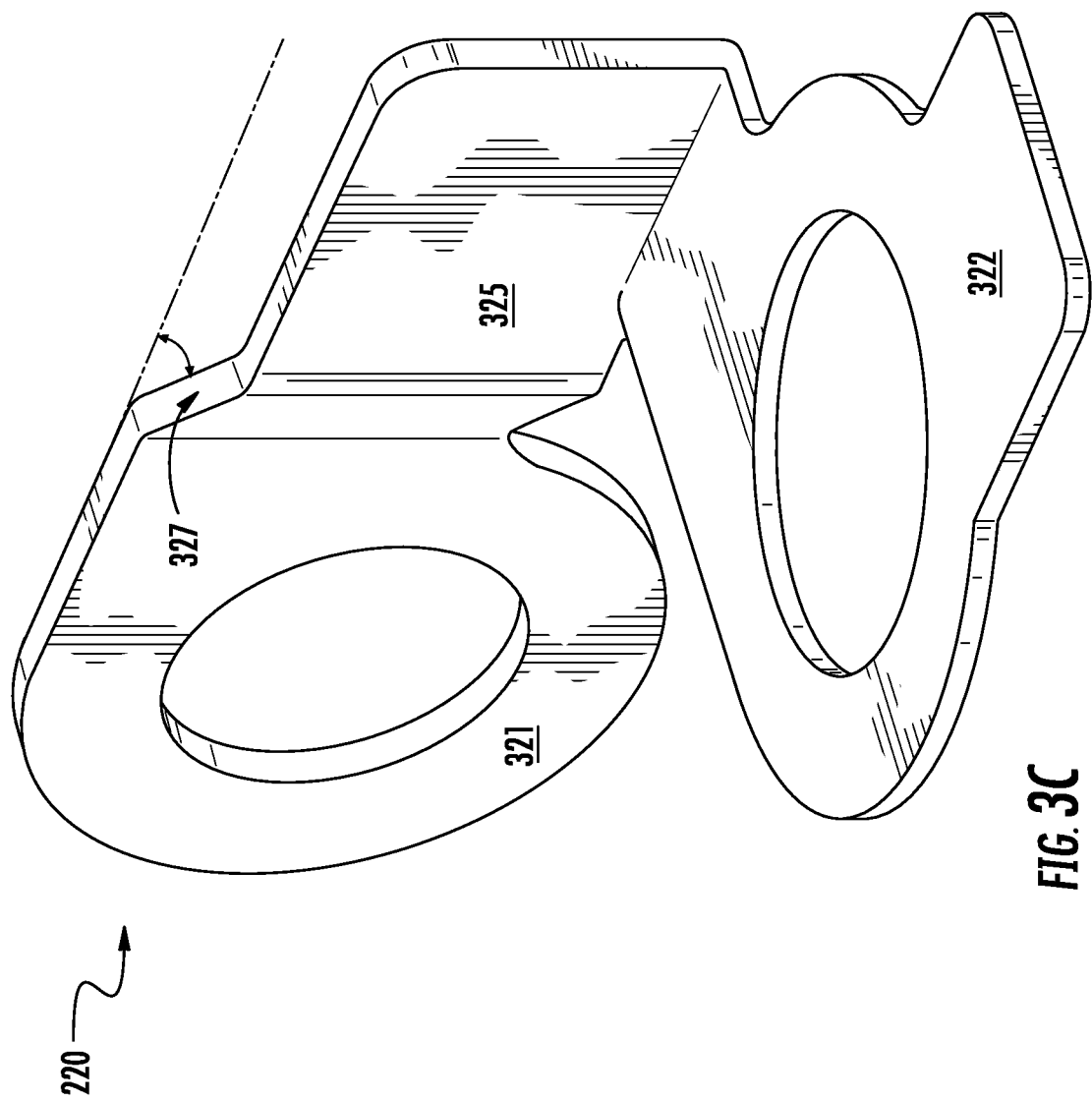
FIG. 3C illustrates a perspective view of a connector for a multiple antenna feed assembly, according to some embodiments.

FIG. 3C illustrates a perspective view of connector 220 for dual antenna feed support 210, according to some embodiments. In some embodiments, connector 220 is formed as a clip having fixtures 321 and 322 connected by a plate 325. In some embodiments, connector 220 is formed of a conductive material, such as a metal. Examples of materials forming connector 220 can include aluminum, tin, copper, gold, or any other metal, and any alloy of the above. In some embodiments, fixture 321, fixture 322, and plate 325 can have substantially planar shapes. Accordingly, plate 325 and fixture 321 can have planar shapes substantially parallel to each other, while fixture 322 can have a planar shape substantially perpendicular to fixture 321, to plate 325, or to both fixture 321 and plate 325. Also shown in FIG. 3C, plate 325 has a planar shape slightly offset from the planar shape of fixture 321 by an angled portion 327. Angled portion 327 forms a gap so that plate 325 can be inserted into slot 317 of antenna feed support 210 (cf. FIG. 3B). In addition to coupling fixture 321 to fixture 322, plate 325 also provides an attachment platform to antenna feed support 210, through slot 317. Accordingly, plate 325 has a thickness and an area that fits tightly into slot 317, so that connector 220 is held in place in assembly 100 (cf. FIGS. 1 and 2). The gap formed by the offset of plate 325 and fixture 321 is then occupied by the insulating material forming antenna feed support 210. Thus, proper electrical insulation is obtained between connector 220 and portions of housing 20 including second antenna 12.

The specific shape and configuration of connector 220 is not limiting of embodiments consistent with the present disclosure. Shapes and configurations in the figures are shown only as exemplary embodiments. One of ordinary skill will recognize that many different configurations can be formed between fixtures 321, 322, and plates 325. Also, the shapes, sizes, and relative sizes of fixtures 321 and 322, and plate 325, can be adapted to the specific application used for an assembly of a multiple antenna feed support as disclosed herein.

FIG. 3D illustrates a perspective view of connector 230 for dual antenna feed support 210, according to some embodiments. Connector 230 includes a dimple 331, or protrusion to ensure electrical coupling between connector 230 and terminal 252 in PCB 150 (cf. FIG. 2). In some embodiments, PCB 150 can include dimples fitting into holes 332 formed in connector 230. Thus, electrical coupling and proper alignment between connector 230 and PCB 150 are guaranteed. Thus, embodiments consistent with the present disclosure reduce tolerance requirements for assembly 100.

Figure 4:
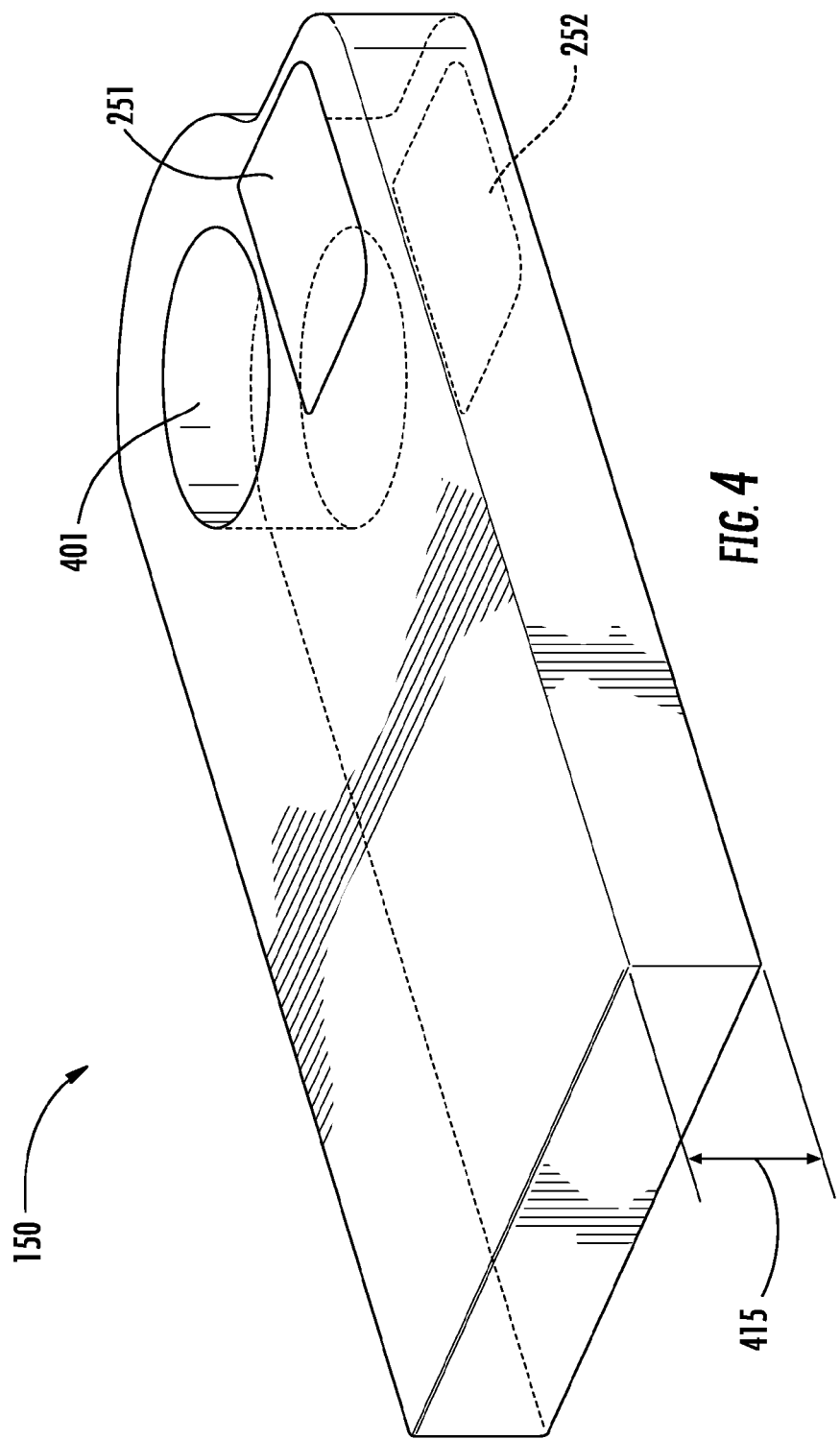
FIG. 4 illustrates a printed circuit board (PCB) with terminals for a multiple antenna feed assembly, according to some embodiments.

FIG. 4 illustrates printed circuit board (PCB) 150 with terminals 251 and 252 for a multiple antenna feed assembly, according to some embodiments. PCB 150 has a thickness 415 that fits tightly into gap 315 of antenna feed support 210 (cf. FIG. 3A). PCB 150 has a shape adapted to receive fixture 142. For example, as shown in FIG. 4 PCB 150 can have a hole 401 to let a screw go through the PCB layer.

Figure 5:
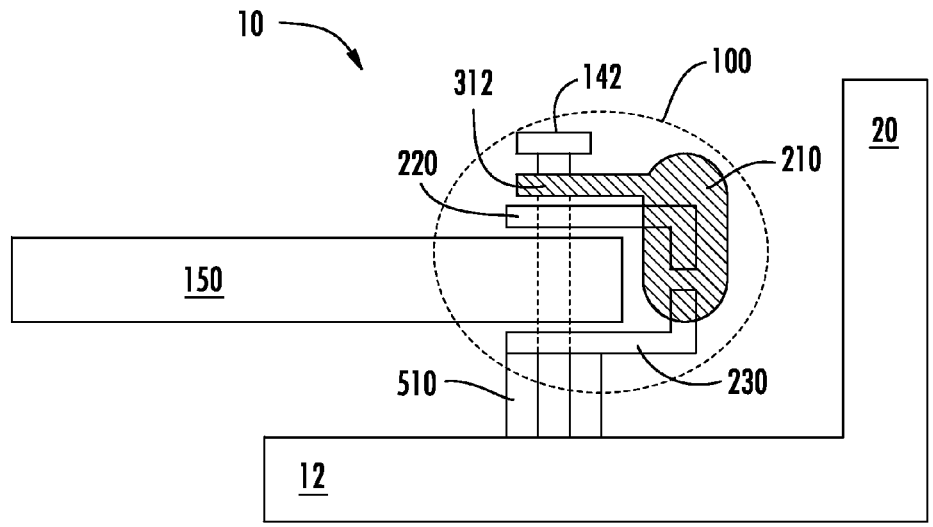
FIG. 5 illustrates a partial cross sectional view of a handheld electronic device including an antenna feed assembly, according to some embodiments.

FIG. 5 illustrates a partial cross sectional view of handheld electronic device 10 and multiple antenna feed assembly 100 including dual antenna feed support 210, according to some embodiments. FIG. 5 illustrates housing 20 having a standoff 510 to attach assembly 100 through fixture 142. Standoff 510 can include a threaded hole to receive and fixedly attach a screw 142. Other elements shown in FIG. 5 are as described in detail above in reference to the previous figures, such as antenna feed support 210, connectors 220 and 230, and PCB 150. Standoff 510 enables an electrical coupling between connector 230 and antenna 12 while keeping portions of PCB 150 electrically isolated from housing 20.

Figure 6:
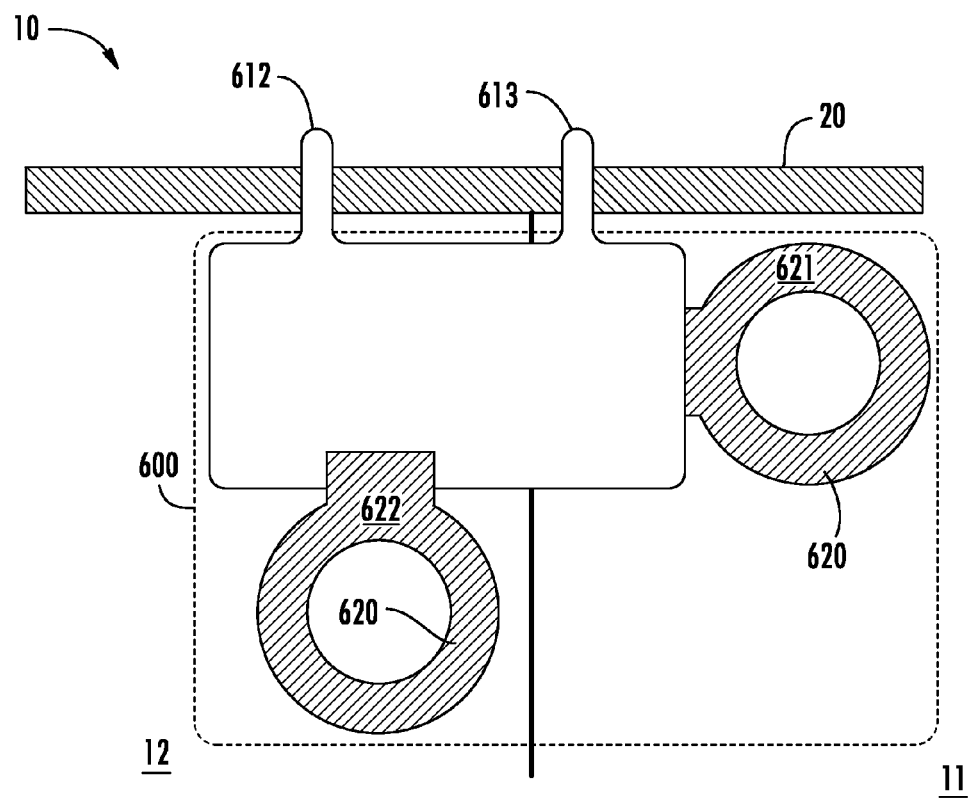
FIG. 6 illustrates a partial top view of a handheld electronic device including a multiple antenna feed assembly, according to some embodiments.

FIG. 6 illustrates a partial top view of a handheld electronic device 10 including a multiple antenna feed assembly 600, according to some embodiments. Multiple antenna feed assembly 600 includes antenna feed support 610. Accordingly, antenna feed support 610 includes alignment pins 612 and 613 to securely fix multiple antenna feed assembly 600 in place, having electrical coupling with antenna 11 and antenna 12. Antenna feed support 610 includes a connector 620 having a first fixture 621 and a second fixture 622. Accordingly, connector 620 can electrically couple antenna 11 to a PCB circuit (e.g., PCB 150, cf. FIG. 1). Antenna feed support 610 can be as antenna feed support 210, with the added feature of alignment pins 612 and 613. Thus, alignment pins 612 and 613 can be formed of the same material as antenna feed support 610. For example, when antenna feed support 610 is formed of injection molded plastic the mold can include protrusions to form alignment pins 612 and 613 from the same injection molding step.

Alignment pins 612 and 613 provide an enhanced attachment of antenna feed support 610 to housing 20 in the handheld electronic device, and improve alignment consistency during the manufacturing process. Furthermore, alignment pins 612 and 613 can serve as guiding elements for assembly 600 within housing 20. For example, by matching pins 612 and 613 with respective slots in housing 20, first fixture 621 can be properly aligned over antenna 11. In some embodiments, after alignment pins 612 and 613 have been inserted through housing 20, portions of the pins protruding out of housing 20 can be sanded off, to obtain a flat and smooth termination on the exterior portion of housing 20.

Figure 7:
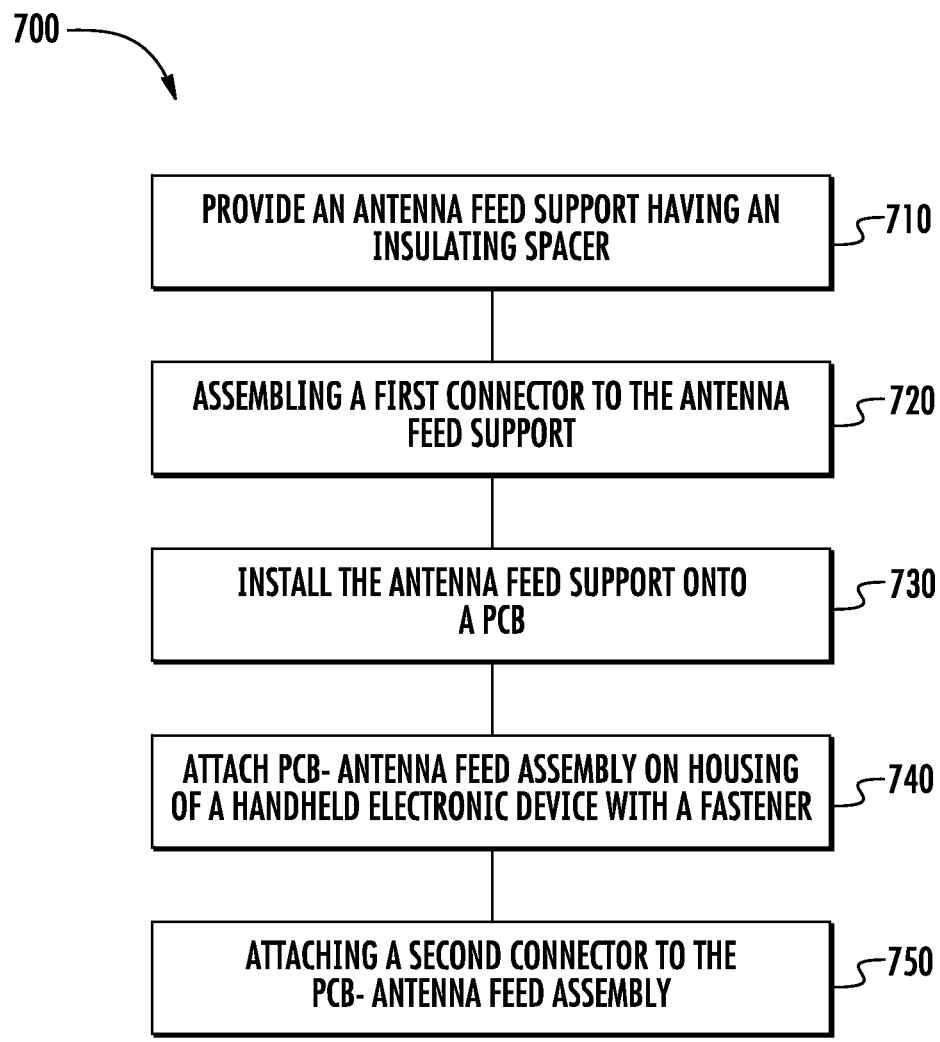
FIG. 7 illustrates a flow chart for a method of forming a multiple antenna feed, according to some embodiments.

FIG. 7 illustrates a flow chart for a method 700 of forming a multiple antenna feed assembly, according to some embodiments. The multiple antenna feed assembly in method 700 can be as described in detail above (e.g., multiple antenna feed assembly 100, cf. FIG. 1). Thus, the multiple antenna feed assembly in method 700 can include an antenna feed support having a body, a gap, a slot, and a ledge (e.g., body 311, gap 315, slot 317, and ledge 312, cf. FIG. 3B). A multiple antenna feed assembly in method 700 can include fasteners to attach the multiple antenna feed assembly to a housing of a handheld electronic device and to a PCB (e.g., fasteners 141 and 142, housing 20, and PCB 150, cf. FIG. 1). In some embodiments of method 700, the multiple antenna feed assembly includes connectors for electrically coupling a first antenna and a second antenna to the PCB (e.g., antennas 11 and 12, and connectors 220 and 230). Method 700 provides a consistent, repeatable, and reliable process for assembling antenna feeds and PCBs in handheld electronic devices. Accordingly, a reduced number of components are used to manufacture the multiple antenna feed assembly, allowing an increased tolerance for the component dimensions.

Step 710 includes providing a antenna feed support having an insulating spacer. In some embodiments, step 710 can include injection molding a single plastic piece having a body, a slot, a gap, and a ledge, to form the insulator spacer. Step 710 can include forming a slot in the antenna feed support, the slot having a thickness and a depth to tightly fit a connector plate. Step 710 can also include forming a gap in the antenna feed support, the gap having a thickness that tightly fits the thickness of the PCB. The insulator spacer may be any protrusion on a side of the slot or gap formed in step 710. Accordingly, the insulator spacer may also include the body and the ledge of the antenna feed support, formed in step 710. In some embodiments, step 710 may include injecting a dielectric material such as plastic into a mold to form the antenna feed support. Accordingly, in some embodiments step 710 may include forming at least a pin in the antenna feed support and passing the pin through a hole formed in the housing of the handheld electronic device. Further, in some embodiments step 710 includes sanding off a portion of the pin protruding from an exterior portion of the housing for the handheld electronic device, forming a smooth exterior surface in the exterior portion.

Step 720 includes assembling a first connector to the antenna feed support. Accordingly, step 720 can include inserting a plate portion of the first connector inside the slot formed in the antenna feed support. Step 720 can also include allowing the ledge of the antenna to be adjacent to a fixture portion of the first connector. Step 730 includes assembling a second connector to the antenna feed support. In some embodiments, step 730 includes forming the first connector in the shape of a clip (e.g., connector 220, cf. FIG. 3C). For example, step 730 may include forming a first fixture adapted to be electrically coupled to a first antenna (e.g., fixture 321, cf. FIG. 3C). Step 730 may include forming a second fixture adapted to be coupled to a second antenna (e.g., fixture 322, cf. FIG. 3C). Also, step 730 may include forming a plate adapted to be inserted in the slot (e.g., plate 325, cf. FIG. 3C).

Step 730 includes installing the antenna feed support onto the PCB, to form a PCB-antenna feed assembly. Accordingly, step 730 can include sliding the antenna feed support into the PCB so that the PCB fits in the gap formed in the antenna feed support. In some embodiments step 730 can further include forming an electrical coupling between the first connector and a first terminal in the PCB circuit. Step 730 can also include forming an electrical coupling between the second connector and a second terminal in the PCB circuit.

Step 740 includes attaching the PCB-antenna feed assembly on a housing of a handheld electronic device with a fastener. In some embodiments step 740 can include attaching the PCB-antenna feed assembly to the housing at two points, using two screws as fasteners. A first point of attachment can overlap a portion of the housing including a first antenna, and a second point of attachment can overlap a portion of the housing including a second antenna. At each of the first and second point of attachment, the fasteners or screws can be threaded into a standoff formed on the interior portion of the housing (e.g. standoff 510, cf. FIG. 5).

Accordingly, step 740 can include passing a first screw through a fixture in the first connector of the antenna feed support; and screwing the second screw to a standoff formed in an interior portion of the housing including the first antenna. In some embodiments, step 740 can also include passing a second screw through the antenna feed support, through the first connector, through the PCB, and through the second connector. In addition, step 740 can include screwing the second screw to a standoff formed in an interior portion of the housing including the second antenna.

Step 750 includes assembling a second connector to the antenna feed support. In some embodiments step 750 can include placing the second connector on top of the standoff formed on the interior portion of the housing. Also, step 750 can include allowing the fastener to press the PCB onto the second connector, so that an electrical coupling is formed between the second antenna and a terminal on the PCB, through the second connector. Step 750 may include aligning a dimple or protrusion in the second connector to a terminal pad in the PCB.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An antenna feed assembly comprising:
    a circuit board that includes first and second terminals;

a body including a slot;
a first ledge extending from the body;
a second ledge extending from the body and separated from the first ledge by a gap;
a first connector disposed in the slot and engaging the first ledge, the first connector securing a first antenna with the body; and
a second connector engaging the second ledge, the second connector securing a second antenna with the body, wherein a portion of the circuit board is located within the gap and interposed between the first and second ledges, the first terminal is electrically coupled to the first connector, and the second terminal is electrically coupled to the second connector.

2. The antenna feed assembly of claim 1, wherein the first connector comprises:
a first opening that receives a first fastener that secures the first connector with the first antenna; and
a second opening that receives a second fastener that secures the second connector with the second antenna.

3. The antenna feed assembly of claim 2, wherein the first ledge comprises an opening that receives the second fastener.

4. The antenna feed assembly of claim 2, wherein the circuit board comprises a circuit board opening that receives the second fastener.

5. The antenna feed assembly of claim 1, wherein the first connector and the second connector engage the body and the body electrically isolates the first connector from the second connector.

6. The antenna feed assembly of claim 1, wherein:
the first ledge extends from a first side of the body and the second ledge extends from the first side of the body in parallel with the first ledge,
the first ledge extends to a first distance from the body, and
the second ledge extends to a second distance from the body that is different than the first distance.

7. The antenna feed assembly of claim 1, wherein the second connector comprises:
a first fixture having a first opening configured to receive a first fastener that secures the first antenna with the body;
a second fixture having a second opening configured to receive a second fastener that secures the second antenna with the body; and
a plate positioned within the slot.

8. The antenna feed assembly defined in claim 1, wherein the body comprises a dielectric material that electrically isolates the first connector from the second connector.

9. The antenna feed assembly defined in claim 1, wherein the first connector comprises a first opening, the second connector comprises a second opening, and the circuit board comprises a third opening, the antenna feed assembly further comprising:
a first fastener that extends through the first opening and electrically couples the first connector to the first antenna; and
a second fastener that extends through the second and third openings and that electrically couples the second connector to the second antenna.

10. The antenna feed assembly defined in claim 9, wherein the first fastener extends through the first opening along a first axis, the second fastener extends through the second and third openings along a second axis, and the first axis is substantially perpendicular to the second axis.

11. The antenna feed assembly defined in claim 9, wherein the first connector comprises a first portion that extends in a first plane and a second portion that extends in a second plane that is substantially perpendicular to the first plane.

12. The antenna feed assembly defined in claim 11, wherein the first portion of the first connector includes the first opening, the second portion of the first connector includes a fourth opening, and the second fastener extends through the fourth opening.

13. The antenna feed assembly defined in claim 12, wherein the first connector comprises a third portion coupled between the first and second portions of the first connector, and the third portion extends in a third plane that is parallel to the first plane and substantially perpendicular to the second plane.

14. An antenna feed assembly comprising:
a circuit board;
a body;
a first ledge extending from the body;
a second ledge extending from the body and separated from the first ledge by a gap, wherein a portion of the circuit board is disposed within the gap;
a first connector engaging the body and securing a first antenna with the body; and
a second connector engaging the second ledge and securing a second antenna with the body, wherein the circuit board is electrically coupled to the first connector and the second connector.

15. The antenna feed assembly of claim 14, wherein:
the circuit board comprises a first terminal on a first surface and a second terminal on a second surface that opposes the first surface,
the first connector engages the body to electrically couple the first terminal to the first connector, and
the second connector engages the body to electrically couple the second terminal to the second connector.

16. The antenna feed assembly of claim 14, wherein the body comprises a slot that receives the first connector.

17. The antenna feed assembly of claim 14, wherein the body, the first ledge, and the second ledge comprise an electrically insulating material that electrically isolates the first connector from the second connector.

18. The antenna feed assembly of claim 14, further comprising a fastener that secures the circuit board with the body, wherein:
the first ledge comprises a first opening,
the circuit board comprises a second opening, and
the fastener extends through the first opening and the second opening.

19. The antenna feed assembly of claim 18, wherein:
the first connector comprises a third opening,
the second connector comprises a fourth opening, and
the fastener extends through the third opening and the fourth opening.

20. An antenna feed assembly for securing a first antenna and a second antenna with a circuit board, the antenna feed assembly comprising:
a body;
a first ledge extending from a first side of the body;
a second ledge extending from the first side of the body and separated from the first ledge by a gap, wherein the gap is configured to receive a portion of the circuit board;
a first connector engaging the body and configured to secure the body to the first antenna; and
a second connector engaging the second ledge and configured to secure the body to the second antenna, wherein the first connector is configured to convey antenna signals from the circuit board to the first antenna, the second connector is configured to convey antenna signals from the circuit board to the second antenna, the body comprises dielectric material, and the first connector is electrically isolated from the second connector.

* * * * *